Patented Aug. 13, 1929.

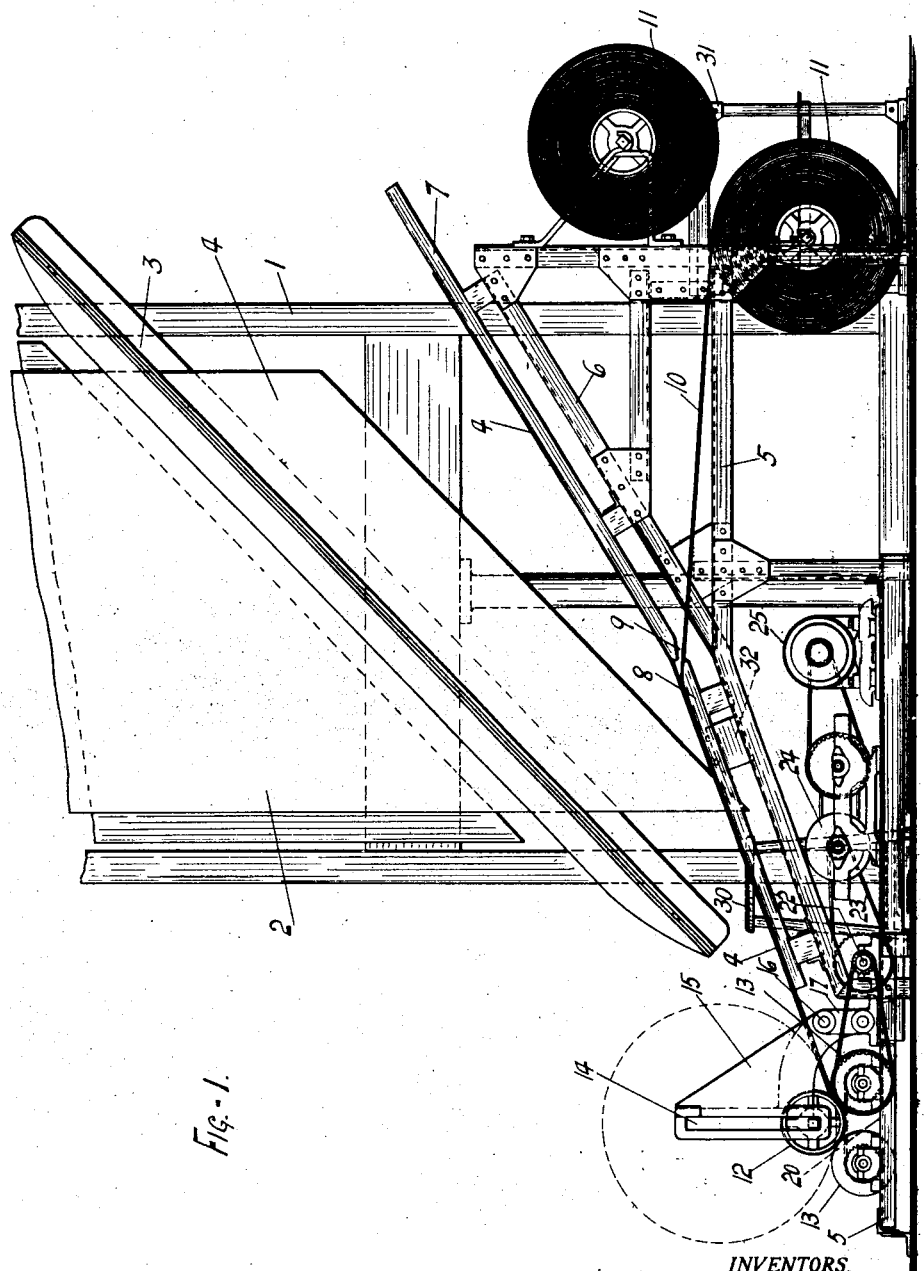

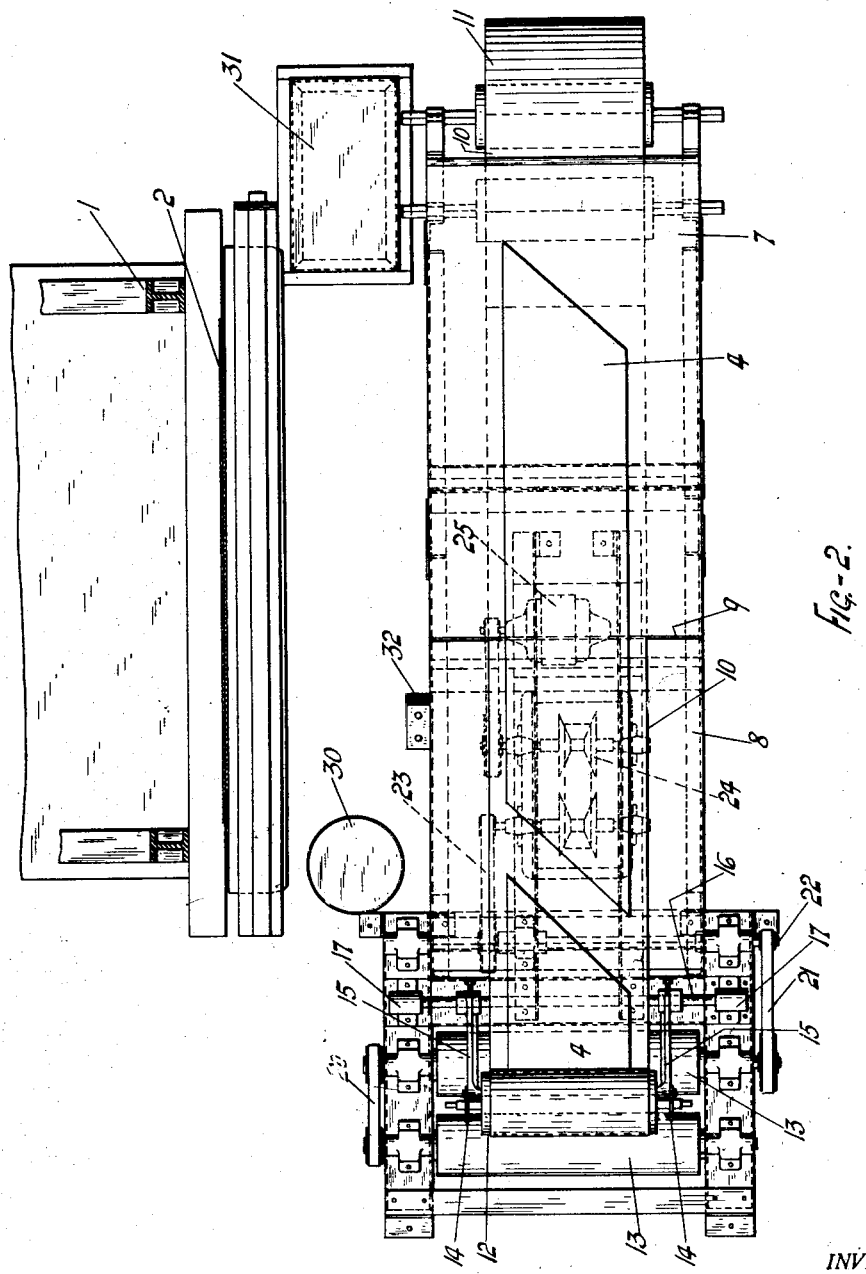

1,724,877

UNITED STATES PATENT OFFICE.

ROBERT IREDELL AND ISIDORE J. REMARK, OF AKRON, OHIO, ASSIGNORS TO THE GENERAL TIRE & RUBBER COMPANY, OF AKRON, OHIO, A CORPORATION OF OHIO.

WIND-UP MECHANISM FOR BIAS CUTTERS.

Application filed May 25, 1926. Serial No. 111,520.

This invention relates to apparatus for use in winding up strips of bias cut fabric from bias cutting machines. The invention is of particular utility in factories engaged in the manufacture of automobile tires and is especially designed for use in conjunction with the type of bias cutter which is known in the art as the vertical bias cutter, these machines being used for cutting fabric on an angle for use in the manufacture of tire carcasses.

In the use of bias cutters of the vertical type, it has always been a problem to find some quick, easily operated and efficient mechanism for conveying the cut strips of fabric away from bias cutting machines of the vertical type, for the reason that the fabric is cut on an angle while it is suspended in a vertical position, the cut being made by a rapidly moving knife blade. The fact that the fabric is vertical and that the cut is at an angle and performed by a slitting operation has presented problems which have made the disposition of the cut strips of fabric difficult to accomplish by machinery.

The present invention provides a very simple and efficient mechanism for conveying the strips of fabric away from the point of cutting and winding up of such strips, the apparatus being so designed and constructed that it will take care of the rapid output of a vertical bias cutter and operates more efficiently than any prior construction which has been offered to the art. The wind-up mechanism will lay the cut fabric strips without wrinkling and the machine is so organized that it will take care of the output of the highest speed cutting machine with only mechanical skill and attention on the part of the operators.

In the drawings, in which the latest and preferred form of the invention is shown:

Figure 1 is a front elevation of a wind-up mechanism of the present invention assembled in proper relationship to a vertical bias cutter; and Figure 2 is a plan view.

The vertical bias cutter referred to herein is of a type well known in the art and it has not been thought necessary to do more than indicate its general outline. It is shown at 1 and the fabric at 2, which latter is fed vertically at the required times and to the required extent by the well known mechanism. The end of the fabric is cut off by a rapidly moving knife blade which travels along a diagonal line and cuts the fabric at the region where it is clamped tightly by an intermittently operated clamp bar 3. Pieces or strips of fabric in the process of cutting and cut are shown at 4.

In front of the machine is arranged a framework, indicated by the numeral 5, which extends across the machine, the upper rails 6 of the framework being inclined in substantial parallelism with the angle and direction of the cut.

Secured to the upper surface of the rails 6 are two tables or supports 7 and 8, one above the other and spaced apart as at 9 a sufficient distance to admit of the passage of a strip of liner material 10 with which the cut strips of rubberized fabric are wound up.

The liner 10 passes from one of the two rolls 11 supported at the side of the framework 5, through the passageway 9 and over the support 8. The strips of cut fabric are taken by the operators and laid upon the support 7, one end of the strip being laid upon the liner 10, the major portion of the strip being laid upon the uncovered table 7.

The liner 10 passes on to a roll 12 which is cradled upon two rollers 13 at the side of the machine, the shaft of the roll 12 being guided in vertical guideways 14 so that as the roll builds up, the center will move upwardly in the guideways.

The guideways are formed in brackets 15 which are horizontally adjustable upon parallel rods 16 extending across the apparatus and received at their ends in vertical brackets 17 attached to the frame 5, the adjustment permitting the apparatus to be used with settings of the bias cutter for different widths of fabric strips.

The rollers 13 forming the cradle for the roll 12 are connected together to revolve at equal speeds by a sprocket chain 20. One of the rollers is driven by a chain 21 from a transverse shaft 22 extending across the machine and driven by a chain 23 from the delivery shaft of a variable speed regulating unit 24 of any well known type, the "Reeves" drive mechanism being indicated in the drawings. The speed variable unit is in turn driven by a motor 25 on the base of the machine.

The operators, standing or sitting at the locations 30 and 31, seize the ends of each fabric strip as it is cut by the machine and lay it on the tables 7 and 8. The adhesion of the rubberized fabric to the liner 10 draws the strips of bias cut fabric along and they are carried by the liner and wound up in the roll 12. The variable speed device enables the operator to time the feed of the liner with the speed of the cutting machine so that each strip closely abuts the adjacent strips and a maximum capacity is obtained in each roll 12. A starting box 32 is conveniently located near one of the operators so that the wind-up mechanism can be stopped and started during the operation of the device. The conveyor belt can be stopped after each cut until the fabric is laid upon the table with its leading end attached to the liner. The end of the strip slides over the smooth surface of the table 7, so that it is straightened out before reaching the liner.

The location of the roll 12 at the floor and the rolls of liner 11 as shown enables the operators to remove a filled roll and replenish the liner without undue lifting. The roll 12 can be rolled out of the cradle and on to the floor without using hoisting machinery. This is conducive to fast and economical operation. Other advantages will be apparent to those familiar with this art and it will be understood that the invention is not necessarily restricted to exact conformity with the details shown and described, but may be varied and modified within the scope of the claim.

What we claim is:

In an apparatus for rolling up strips of fabric from a vertical bias cutting machine, a table in front of the machine upon which strips of bias cut fabric are delivered from said machine, said table being inclined and extending parallel with the front of the machine, said table having an opening extending transversely thereof intermediate its ends, the upper portion of the table at the rear of said opening being inclined at a relatively steep inclination and the lower portion thereof forwardly of the opening being inclined at a lesser inclination, and means for conducting a liner from beneath the table through the opening and over the lower portion of the table and for winding up the liner at the lower end of the table with the strips of rubberized fabric cut by the machine.

In testimony whereof we affix our signatures.

ROBERT IREDELL.
ISIDORE J. REMARK.